US008265921B2

(12) United States Patent
Kim (10) Patent No.: US 8,265,921 B2
(45) Date of Patent: Sep. 11, 2012

(54) SYSTEMS AND METHODS FOR CONCURRENTLY EMULATING MULTIPLE CHANNEL IMPAIRMENTS

(75) Inventor: Joseph Yuseok Kim, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 387 days.

(21) Appl. No.: 12/712,764

(22) Filed: Feb. 25, 2010

(65) Prior Publication Data

US 2011/0208504 A1    Aug. 25, 2011

(51) Int. Cl.
*G06F 9/455* (2006.01)

(52) U.S. Cl. ............... 703/26; 703/19; 703/21; 713/400

(58) Field of Classification Search .............. 703/19–23, 703/26, 28; 455/67.11, 67.14, 423; 713/400
See application file for complete search history.

(56) References Cited

U.S. PATENT DOCUMENTS

| 7,013,257 | B1 | 3/2006 | Nolan et al. | |
| 7,286,802 | B2* | 10/2007 | Beyme et al. | 455/67.14 |
| 7,336,701 | B2 | 2/2008 | Kearney et al. | |
| 7,418,240 | B2* | 8/2008 | Hsu et al. | 455/67.13 |
| 7,430,257 | B1* | 9/2008 | Shattil | 375/347 |
| 7,593,449 | B2* | 9/2009 | Shattil | 375/130 |
| 7,788,684 | B2* | 8/2010 | Petrovic et al. | 725/18 |
| 7,821,938 | B2* | 10/2010 | Friedman et al. | 370/232 |
| 7,965,761 | B2* | 6/2011 | Shattil | 375/147 |
| 2007/0116295 | A1 | 5/2007 | Vandewege et al. | |
| 2008/0259901 | A1* | 10/2008 | Friedman et al. | 370/349 |

OTHER PUBLICATIONS

E. Grayver and P. Dafesh, "Multi-Modulation Programmable Transceiver System with Turbo Coding," IEEE Aerospace, Big Sky, MT, 2005.
E. McDonald, R. Speelman, E. Grayver, and N. Wagner, "Real-Time Hardware/Software Approach to Phase Noise Emulation," IEEE Aerospace, Big Sky, MT, 2006.
J. Kim, J. Hant, and V. Swaminathan, "Real-Time Emulation of Internet Applications over Satellite Links Using the SAtellite Link EMulator (SALEM)," AIAA, San Diego, CA, 2008.
E. Grayver, J. Chen, and A. Utter, "Application-layerCodec Adaptation for Dynamic Bandwidth Resource Allocation," IEEE Aerospace, Big Sky, MT, 2008.
Fairhurst, G., and Wood, L., "Advice to Link Designers on Link Automatic Repeat reQuest (ARQ)," RFC 3366, Network Working Group, The Internet Society, 2002.

* cited by examiner

*Primary Examiner* — Russell Frejd
(74) *Attorney, Agent, or Firm* — Sutherland Asbill & Brennan LLP (57) ABSTRACT

Systems and methods are provided for concurrently emulating multiple channel impairments. The systems and methods may include storing a plurality of channel impairment profiles, where each channel impairment profile corresponds to a respective channel impairment type; receiving a selection of two or more of the plurality of channel profiles; generating a composite impairment profile by combining the selected two or more channel profiles, the composite profile specifying time-variant impairments, the composite profile reflecting a combination of the respective impairment types of the selected channel profiles; and applying the time-variant impairments specified by the composite profile to an input real-time data stream to generate an impaired real-time data stream, where a timing of the application of the time-variant impairments is based at least in part upon timing data from a real-time clock.

20 Claims, 10 Drawing Sheets

Channel Data

```
-1193      //Prior 1193 blocks error free
 397       //1194th block, bit 397 in error
 456       //1195th block, bit 456 in error
 344       //1196th block, bit 344 in error
 499       //1197th block, bit 499 in error
-120       //Following 120 blocks error free
 ...
```

FIG. 5A

Channel Impairment Profile

Block size = K bytes

| Blk 1190 | Blk 1191 | Blk 1192 | Blk 1193 | Blk 1194 | Blk 1195 | Blk 1196 | Blk 1197 | Blk 1198 | Blk 1199 |
|---|---|---|---|---|---|---|---|---|---|
| 0 | 0 | 0 | 0 | 1 | 1 | 1 | 1 | 0 | 0 |

Status

FIG. 10

SYSTEMS AND METHODS FOR CONCURRENTLY EMULATING MULTIPLE CHANNEL IMPAIRMENTS

FIELD OF THE INVENTION

Aspects of the invention relate generally to emulating multiple channel impairments, and more particularly, to concurrently emulating multiple channel impairments.

BACKGROUND OF THE INVENTION

Wireless communications links are sometimes characterized by relatively high bit error rates (BER), large delay-bandwidth products, variable round-trip times, asymmetric channels, and impairments caused by various expected and/or unexpected events such as weather, fading, blockage, or jamming. In order to test the functionality and performance of next-generation wireless networks, it is important to have the ability to emulate communication applications in real-time over communications links with similar characteristics. Thus, there is a need for systems and methods for concurrently emulating multiple channel impairments.

SUMMARY OF THE INVENTION

According to an example embodiment of the invention, there is a multi-channel emulator system. The system may include a memory that stores a plurality of channel impairment profiles, where each channel impairment profile corresponds to a respective channel impairment type; a real-time clock that generates timing data; and a processor in communication with the memory and the real-time clock. The processor may be configured to: receive a selection of two or more of the plurality of channel impairment profiles; generate a composite impairment profile by combining the selected two or more channel profiles, the composite impairment profile specifying time-variant impairments, the composite impairment profile reflecting a combination of the respective impairment types of the selected channel profiles; and apply the time-variant impairments specified by the composite impairment profile to an input real-time data stream to generate an impaired real-time data stream, where a timing of the application of the time-variant impairments is based at least in part upon the timing data from the real-time clock.

According to another example embodiment of the invention, there is a computer-implemented method for emulating multiple channel impairments. The method may include storing, in a memory, a plurality of channel impairment profiles, where each channel impairment profile corresponds to a respective channel impairment type; receiving a selection of two or more of the plurality of channel profiles; generating a composite impairment profile by combining the selected two or more channel profiles, the composite profile specifying time-variant impairments, the composite profile reflecting a combination of the respective impairment types of the selected channel profiles; and applying the time-variant impairments specified by the composite profile to an input real-time data stream to generate an impaired real-time data stream, where a timing of the application of the time-variant impairments is based at least in part upon timing data from a real-time clock. The prior steps may be performed by one or more computers, according to an example embodiment of the invention.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention can provide systems and methods for concurrently emulating multiple channel impairments for wireless communications links. In an example embodiment of the invention, the ability to concurrently emulate multiple channel impairments can advantageously allow multiple independent or dependent channel impairments to be evaluated, analyzed, or considered concurrently when designing or evaluating wireless communications links, or the suitability of utilizing one or more applications with the communications links. Likewise, example embodiments of the invention may perform the concurrent emulations of multiple channel impairments in real-time so that actual end system applications may be tested or evaluated during typical or expected in-the-field operations. It will be appreciated that novel data handling techniques are presented herein to provide for real-time concurrent emulation of multiple channel impairments, according to an example embodiment of the invention.

Figures 1, 2:
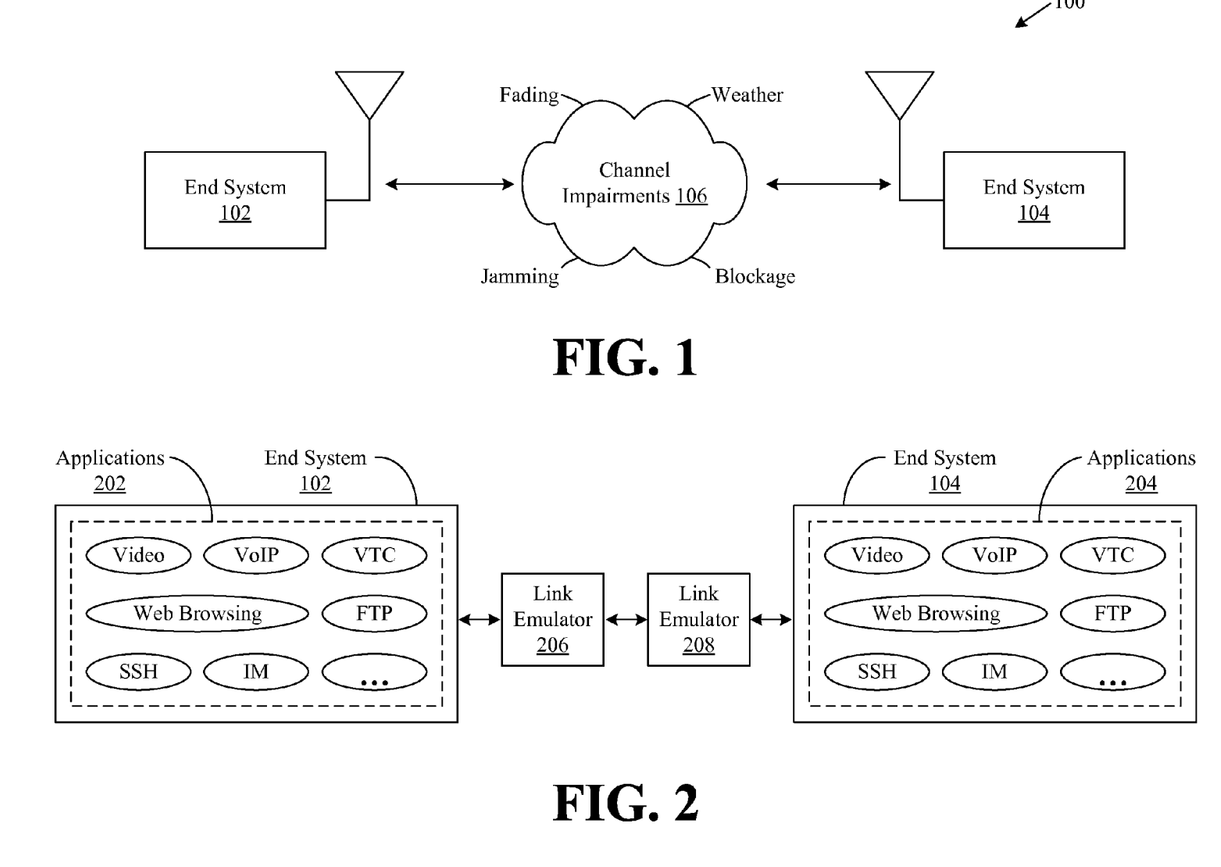
FIG. 1 illustrates an example wireless communications link between at least a first end system and a second end system, according to an example embodiment of the invention.
FIG. 2 illustrates an example block diagram illustrating the use of link emulators with end systems, according to an example embodiment of the invention.

FIG. 1 illustrates an example wireless communications link between at least a first end system 102 and a second end system 104. The first or second end systems 102, 104 may be comprised of one or more of computers, servers, mobile devices, cellular phones, personal communications devices, handheld or portable wireless devices, satellites, satellite terminals, or other wireless transmitters and/or receivers. The first and second end systems 102, 104 can communicate with each other, either in a uni-directional or bidirectional manner, over one or more wireless communications links. It will be appreciated that one of the end systems 102, 104 may not necessarily be a wireless transmitter or receiver itself, but may instead be in communication with another device or computer that includes a wireless transmitter or receiver.

These wireless communications links, which may connect at least end systems 102 and 104, can support one or more frequency channels or bands that enable data and/or voice transmissions. Examples of these wireless communications links may be implemented using wireless networks supporting one or more of wireless protocols, which may include but are not limited to: data, voice, video, cellular digital packet data (CDPD), packet data cellular (PDC-P), general packet radio service (GPRS), radio transmission technology (RTT), Bluetooth, Multichannel Multipoint Distribution Service (MMDS), Local Multipoint Distribution Service (LMDS), Worldwide Interoperability for Microwave Access (WiMAX), 802.11 (Wi-Fi) or other 802.XX protocol, EDGE, 2G, 3G, 4G, long-term evolution (LTE), satellite communications protocols (e.g., ALOHA, satellite transport protocol), etc.

In FIG. 1, the wireless communications links between the first end system 102 and the second end system 104 can be subject to one or more channel impairments 106. In an example embodiment of the invention, the channel impairments 106 may be characterized in terms of physical channel impairments such as, but not limited to, blockage (e.g., locations and types of buildings or other blocking structures), terrain or structures, weather conditions (e.g., storms, hurricanes, tornadoes, smog), or other environmental conditions. Channel impairments 106 can also be characterized in terms of one or more effects on signal reception or signal transmission, such as, but not limited to, fading resulting from signal propagation media characteristics, or jamming/interference provided by one or more intentional or unintentional jamming devices. Likewise, it will be appreciated that channel impairments 106 can likewise be characterized in terms of one or more time-variant events, such as, but not limited to, nuclear-related events, explosions, environmental events, speed movement through a terrain, etc. Yet further, the channel impairments can also be characterized based upon parameters of signal reception or signal transmission, such as, but not limited to, a bit error rate (BER), a signal-to-noise ratio (SNR), or direct specifications of bit, block, or packet errors. It will be appreciated that the channel impairments described herein may fall within multiple categories or types of channel impairments. For example, weather may be a physical channel impairment as well as a time-variant event, according to an example embodiment of the invention.

FIG. 2 illustrates an example block diagram illustrating the use of link emulators with end systems, according to an example embodiment of the invention. As shown in FIG. 2, a first link emulator 206 may be coupled to the first end system 102. Likewise, a second link emulator 208 may be coupled to the second end system 104. The first and second link emulators 206, 208 may also be provided as part of an internal component (e.g., a memory) of the respective first and second end systems 102, 104. However, the first and second link emulators 206, 208 may also be implemented as respective processor-based systems having respective memories storing respective computer-executable instructions.

The first and second link emulators 206, 208 may each be a two-or-more port device (e.g., having at least one respective input and output port) running in real-time and working like (e.g., emulating) a physical channel. As such, the first and second link emulators 206, 208 may be operative to concurrently emulate multiple channel impairments during the transmission or receipt of a real-time stream of data or information, as described in further detail herein, according to an example embodiment of the invention. As an example, link emulator 206 may emulate multiple channel impairments that may be expected when a real-time data stream or information is transmitted from end system 102 to end system 104. Likewise, link emulator 208 may emulate multiple channel impairments that may be expected when a real-time data stream or information is transmitted from end system 104 to end system 102. It is appreciated that the types of channel impairments that are to be concurrently emulated can be specified or selected by a user of the respective emulators 206, 208, according to an example embodiment of the invention. The first and second link emulators 206, 208 may each include at least a first port for receiving a real-time input data stream or information, and at least a second port for outputting a corresponding real-time output data stream or information.

The concurrent emulation of multiple channel impairments via respective first and second link emulators 206, 208 may allow for an evaluation, analysis, or test of how multiple channel impairments may affect the operation of one or more applications 202, 204 for respective end systems 102, 104. In an example embodiment of the invention, the applications 202, 204 may be associated with one or more of video, voice over IP (VoIP), video teleconferencing (VTC), web browsing, file transfer protocol (FTP), secure shell (SSH), instant messaging (IM), and the like. While certain applications 202, 204 have been identified above, these applications are intended to be for example purposes only and not to limit the scope of inventions that may be supported in accordance with example embodiments of the invention.

It will be appreciated that while two link emulators 206, 208 are illustrated in FIG. 2, other example embodiments of the invention may utilize only a single link emulator without departing from example embodiments of the invention. For example, the single link emulator may be utilized where emulation is only needed for analysis of communications in a single direction (e.g., from end system 102 to end system 104, or from end system 104 to end system 102). Alternatively, the single link emulator may simply embody the functionality of both the link emulators 206, 208 in a single emulator, according to an example embodiment of the invention.

Figure 3A:
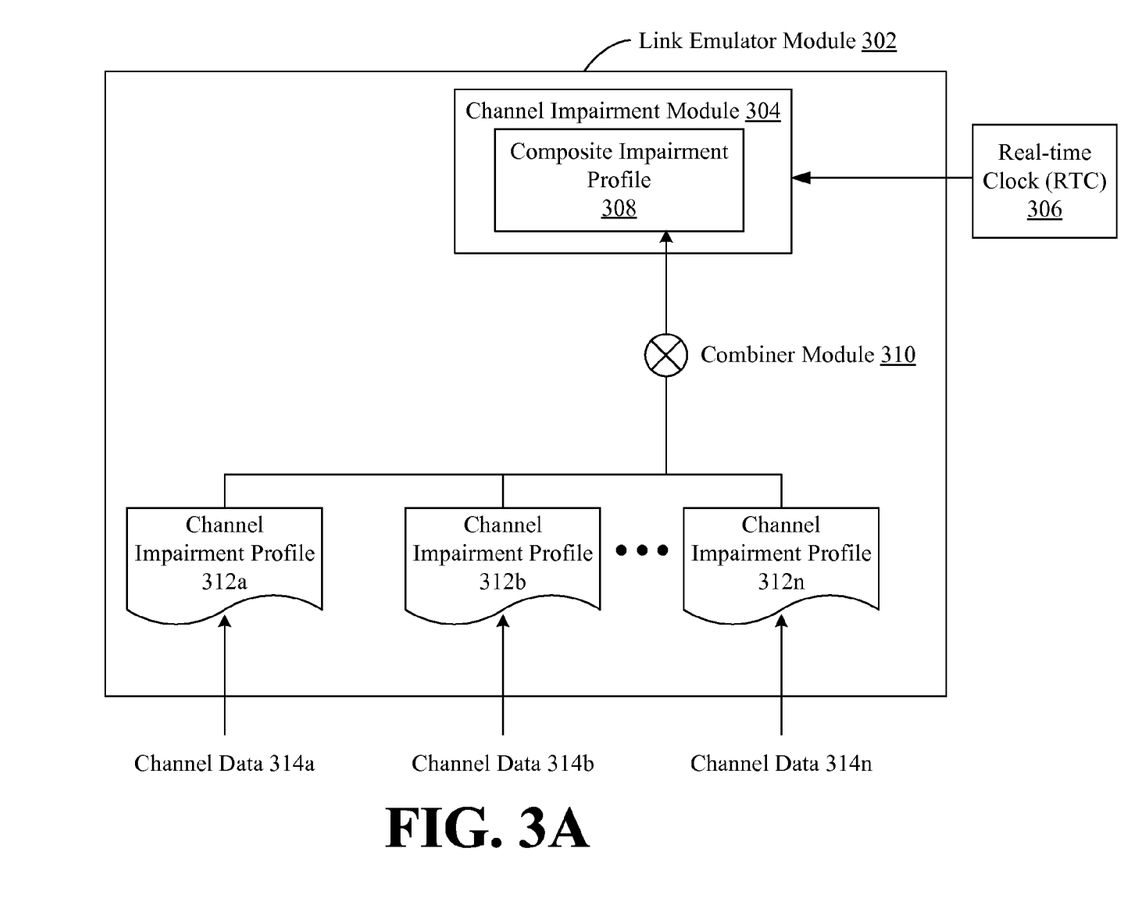
FIG. 3A illustrates a functional block diagram of an example link emulator module, according to an example embodiment of the invention.

FIG. 3A illustrates a functional block diagram of an example link emulator module 302, according to an example embodiment of the invention. The example link emulator module 302 may be used to implement the functionality for either one of link emulators 206, 208 in FIG. 2. As shown in FIG. 3A, the link emulator module 302 may include a channel impairment module 304 that may include or be in communication with a timing device or real-time clock (RTC) 306, according to an example embodiment of the invention. As also shown in FIG. 3A, there may be a combiner module 310 and a plurality of channel impairment profiles 312a-n.

As described in further detail herein, respective channel data 314a-n corresponding to respective types of channel impairments can be utilized to generate respective channel impairment profiles 312a-n. The channel data 314a-n can be obtained for actual measurement in the field or otherwise generated analytically from a simulation or analysis tool such as MATLAB. Each channel impairment profile 312a-n that is derived from the respective channel data 314a-n may enable the link emulator module 302 to determine which blocks of a data stream have any errors, and to further determine how a packet or frame (which may include one or more blocks) of a data stream should be impacted according to the type of channel impairment that is to be reflected by the respective channel impairment profile 312a-n. When two or more channel impairment profiles 312a-n are selected, the selected ones of the channel impairment profiles 312a-n can be combined using a combiner module 310 to generate a composite impairment profile 308. The composite impairment profile 308 can then reflect an overall impact of multiple channel impairments corresponding to the selected ones of the channel impairment profiles 312a-n. A channel impairment module 304 can utilize the composite impairment profile 308 to emulate concurrent channel impairments to determine whether one or more frames or packets of a received data stream should be maintained, dropped, and/or altered, according to an example embodiment of the invention. Indeed, the channel impairment module 304 may be operative to apply one or more impairments to an input real-time data stream in order to generate an impaired real-time data stream. In an example embodiment of the invention, the composite impairment profile 308 can be used to determine the impairments to be applied to packets or frames of a real-time data stream, as well as the timing of the application of the impairments to packets or frames of the real-time data stream.

Figure 3B:
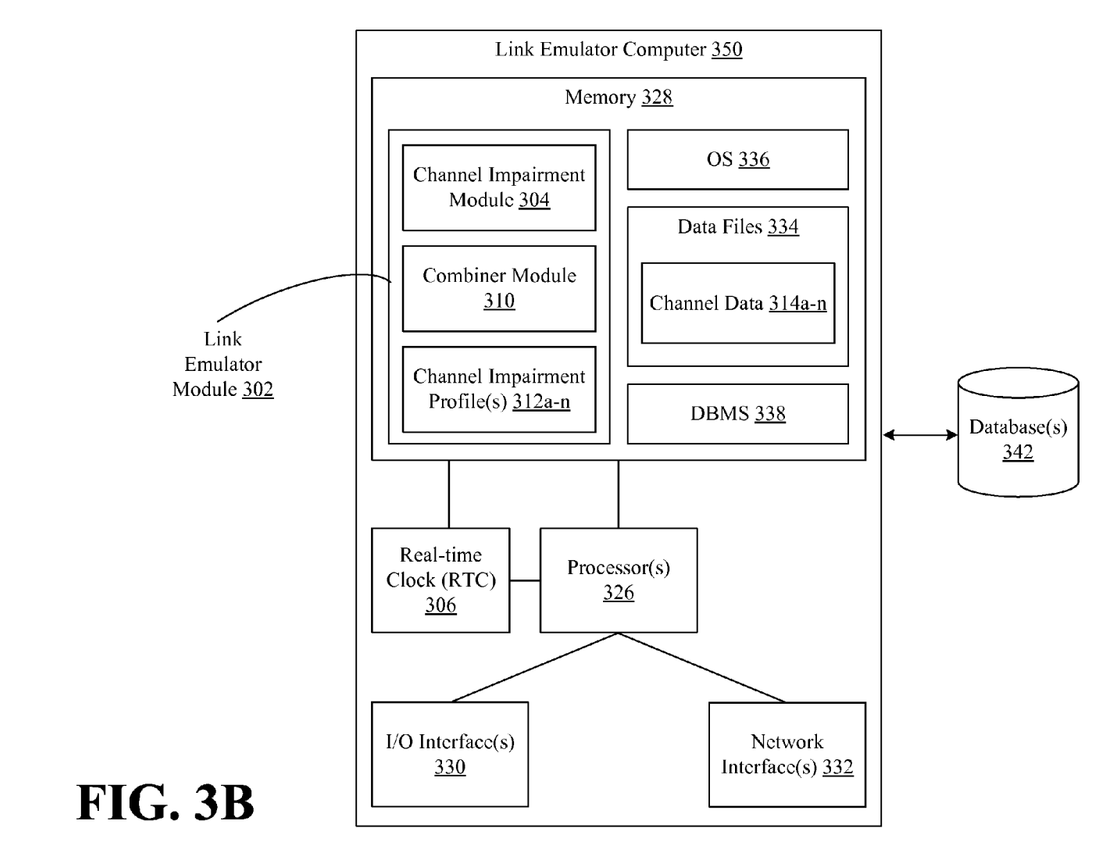
FIG. 3B illustrates a block diagram of an example link emulator computer, according to an example embodiment of the invention.

FIG. 3B illustrates a block diagram of an example link emulator computer 350, according to an example embodiment of the invention. The link emulator computer 350 may incorporate, perhaps as part of its memory 328, the components of the link emulator module 302 described with respect to FIG. 3A. The example link emulator computer 350 may be used for implementing any of respective link emulators 206, 208, according to an example embodiment of the invention. Alternatively, the link emulator computer 350 may also be used for implementing a combination of respective link emulators 206, 208 with respective end systems 102, 104, according to an example embodiment of the invention.

The link emulator computer 350 may be configured for accessing and reading associated computer-readable media having stored thereon data and/or computer-executable instructions for implementing the various methods described herein. It is appreciated that various components and features of each of the link emulator computers 350 may also be provided in multiples (e.g., multiple processors, memory elements, application modules, etc.), but may be referred to herein in the singular for simplicity.

The link emulator computer 350 may be comprised of one or more processor-driven devices, such as, but not limited to, a server computer, a personal computer, a laptop computer, a handheld computer, and the like. In addition to having one or more processors 326, the link emulator computer 350 may further include one or more memories 328, one or more input/output ("I/O") interfaces 330, and one or more network interfaces 332. The memories 328 may store data files 334, which can include channel data 314a-n, and various program modules, such as an operating system ("OS") 336, a channel impairment module 304, a combiner module 310, channel impairment profiles 312a-n, and a database management system ("DBMS") 338 for accessing one or more databases 342. A timing device or real-time clock 306 may be accessible by the memory 328 and/or processor 326. The I/O interface(s) 330 may facilitate communication between the processor 326, and various I/O devices, such as a keyboard, mouse, printer, microphone, speaker, monitor, and the like. The network interface(s) 332 may take any of a number of forms, such as a network interface card, a modem, a wireless network card, and the like.

As described herein, the link emulator computer 350 may be configured or programmed to receive channel data 314a-n from one or more sources. For example, the channel data 314a-n may be created from field measurements or through simulations and be provided in one of a variety of file formats, including ASCII formats, binary formats, comma-separated-value (CSV) formats, excel formats, MATLAB formats, and the like, to the link emulator computer 350. The link emulator computer 350 may be further configured or programmed to generate respective channel impairment profiles 312a-n from the respective channel data 314a-n. The link emulator computer 350 may further be configured or programmed to receive selections of multiple channel impairments from a user, and to combine channel impairment profiles 312a-n corresponding to the selected multiple channel impairments into a composite impairment profile of the channel impairment module 304. Thus, the channel impairment module 304 may be utilized by the link emulator computer 350 to apply one or impairments specified by the composite impairment profile to an input real-time data stream in order to generate an impaired real-time data stream.

It is appreciated that one or more databases 342 may be accessible to link emulator computer 350 via a DBMS 338. The databases 342 can store additional information that may support the concurrent emulation of multiple channel impairments as described herein. For example, the database 342 may store algorithms, processes, or information utilized in converting channel data 314 into standardized channel impairment profiles 312a-n. It will be appreciated that some of the information (e.g., channel data 314a-n) in memory 328 may additionally or alternatively be stored in the database 342, according to an example embodiment of the invention. Although a single database 342 is referred to herein for simplicity, it is appreciated that multiple physical and/or logical data storage devices or databases may be used to store the above mentioned data. For security and performance purposes, the link emulator computer 350 may have a dedicated connection to the database 342. However, the link emulator computer 350 may also communicate with the database 342 via a network. According to other embodiments, the link emulator computer 350 may include the database 342 locally.

Figure 4:
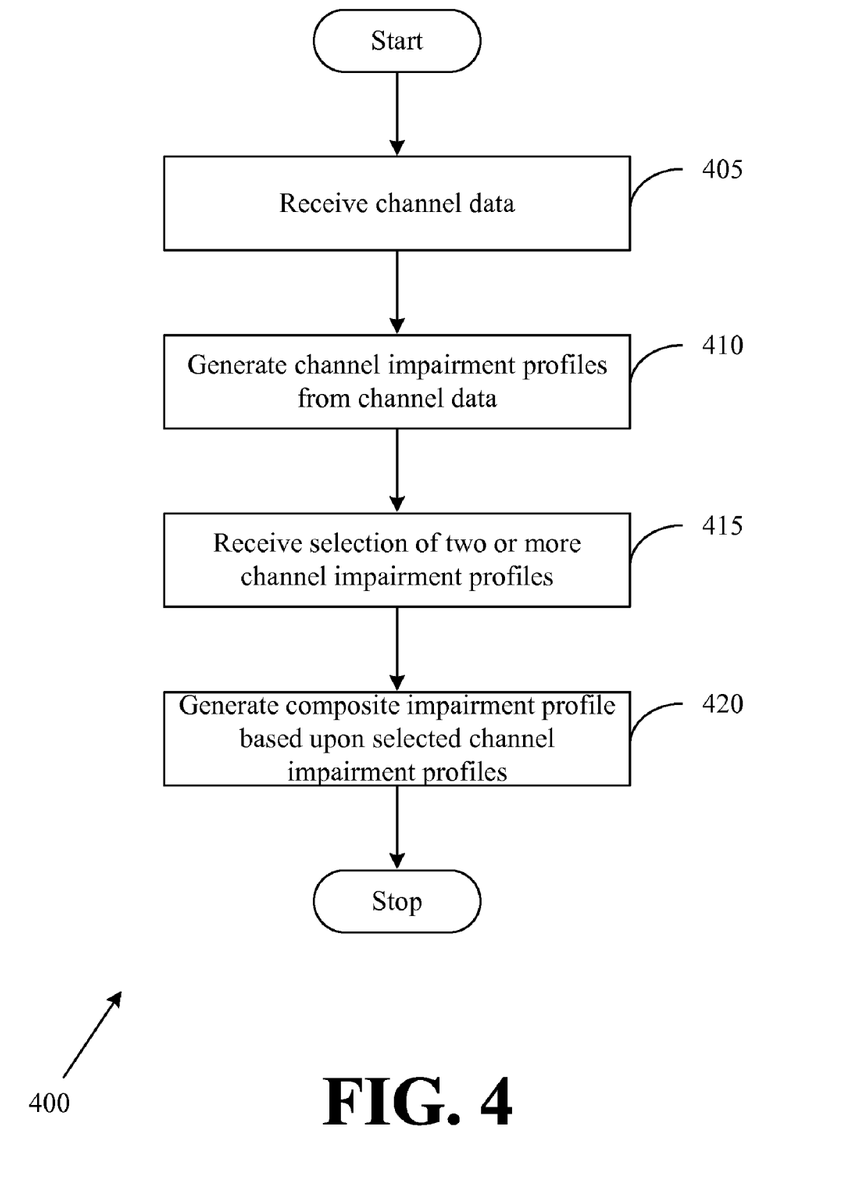
FIG. 4 illustrates an example flow diagram for generating a composite impairment profile from selected ones of the channel impairment profiles, according to an example embodiment of the invention.

FIG. 4 illustrates an example flow diagram for generating a composite impairment profile 308 from selected ones of the channel impairment profiles 312a-n, according to an example embodiment of the invention. At block 405, channel data 314a-n may be received or otherwise obtained by the link emulator module 302. Each set of channel data 314a-n may correspond to a respective type of channel impairment. As described herein, the types of channel impairments reflected by the channel data 314a-n may be characterized based upon one or more of the following, but not limited to:

Physical Channel Impairments
  a. Blockage (e.g., 1=blocked, 0=OK or not blocked)
  b. Terrain or structures
  c. Weather conditions
  d. Other environmental conditions
  e. Effects on signal reception or signal transmission power
  f. Fading resulting from signal propagation media characteristics
  g. Jamming/Interference provided by one or more intentional or unintentional jamming devices Time-Variant Events
  a. Nuclear-related events or nuclear scintillation
  b. Explosions
  c. Environmental events
  d. Speed movement through a terrain
Parameters of Signal Reception or Signal Transmission
  a. Bit error rate (BER)
  b. Signal-to-Noise Ratio (SNR)
  c. Direct specifications of bit, block, or packet or frame errors.

Figure 5A:
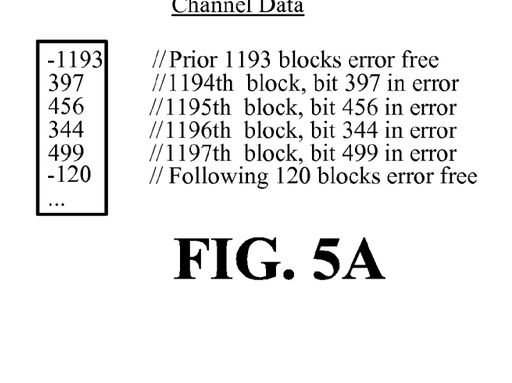
FIGS. 5A and 6A illustrate example respective channel data in accordance with example embodiments of the invention.
Figure 6A:
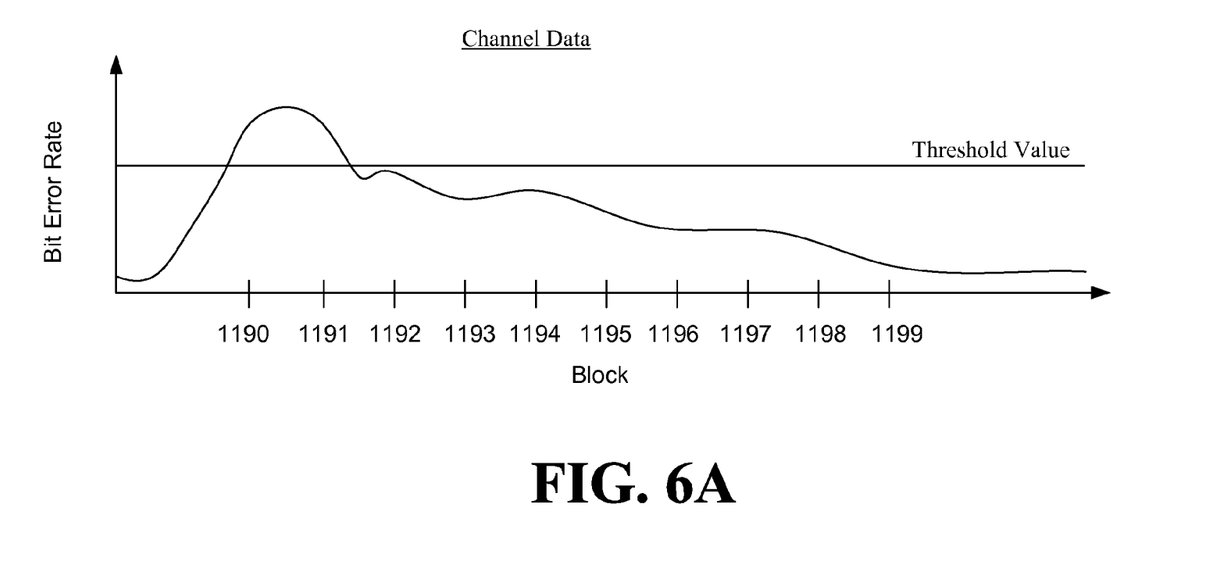

FIGS. 5A and 6A illustrate respective examples of channel data 314a-n, according to an example embodiment of the invention. It will be appreciated that the respective channel data of FIGS. 5A and 6A may characterize an example of signal transmission or reception that occurs during one or more events or based upon the presence of certain physical channel impairments.

The channel data of FIG. 5A directly specifies the location of bit and block errors that may result from the particular channel impairment, according to an example embodiment of the invention. More specifically, in FIG. 5A, the channel data identifies a sequence of blocks from a real-time stream of data or information, and further indicates any blocks that may be impacted or impaired by a particular channel impairment. For example, the channel data of FIG. 5A indicates that all blocks prior to block 1193 are error-free, and are not impacted by the channel impairment. However, blocks 1194, 1195, 1196, and 1197 have at least one bit error, and thus, are impacted by the channel impairment. More specifically, block 1194 includes an error at bit 397; block 1195 includes an error at bit 456; block 1196 includes an error at bit 344; and block 1197 includes an error at bit 499. The remaining 120 blocks after block 1197 are likewise error-free. Accordingly, it will be appreciated that the channel data of FIG. 5A illustrates which blocks of a real-time stream of data or information will be impacted or impaired by a particular channel impairment. It will also be appreciated that while FIG. 5A illustrates only a single respective bit error for blocks 1194, 1195, 1196, and 1997, one or more of those blocks could include multiple bit errors without departing from example embodiments of the invention. It will be appreciated that the channel data of FIG. 5A can be obtained from actual measurements in the field or from software simulation of a particular channel impairment type.

Similarly, FIG. 6A illustrates another example of channel data that specifies bit error rates for certain transmitted blocks. More specifically, in FIG. 6A, the channel data identifies a sequence of blocks from a real-time stream of data or information, and further indicates how the respective bit error rate for the blocks may be impacted or impaired by a particular channel impairment. For example, in FIG. 6A, the channel data identifies a sequence of blocks from a real-time stream of data or information, and further indicates an estimated or actual bit error rate for those particular blocks. As shown in FIG. 6A, a threshold value has been illustrated in relation to the bit error rates. The bit error rates for blocks 1190 and 1191 exceed the threshold value while the bit error rates for the other blocks are below the threshold value. As described herein, the threshold value can be used to determine whether one or more bits of a block include a bit error, according to an example embodiment of the invention. It will be appreciated that the particular bit(s) of block 1190 and 1191 that are to be altered (e.g., flipped) may be randomly determined according to the bit error rate, according to an example embodiment of the invention. For example, the bit error rate may represent a probability that any particular bit in blocks 1190 and 1191 will be altered, and each bit in the block can be analyzed independently with respect to the bit error rate to determine whether that respective bit is to be altered, according to an example embodiment of the invention. It will be appreciated that the more bits that are in a block (or packet), the more likely a bit is to be dropped because every bit may have the same probability of being dropped according to the bit error rate. It will also be appreciated that the channel data of FIG. 6A can be obtained from actual measurements in the field or from software simulation of a particular channel impairment type.

It will also be appreciated that the channel data in FIGS. 5A and 6A has been provided for purposes of illustration only. Indeed, other channel data is available without departing from example embodiments of the invention. For example, time-variant packet error rates may be specified instead of bit error rates. The packet error rate may determine the probability that a particular packet/block is dropped, and such probability is not impacted by the number of bits included in a particular packet/block.

Referring to FIG. 4, having received or obtained the plurality of channel data 314a-n at block 405, processing may then proceed to block 410. At block 410, the link emulator computer 350 can generate the corresponding channel impairment profiles 312a-n from the respective channel data 314a-n. In an example embodiment of the invention, the channel data 314a-n can be transformed into standardized channel impairment profiles 312a-n that indicate which of a plurality of blocks are to be maintained or dropped. Likewise, in an example embodiment of the invention, the channel impairment profiles 312a-n may optionally further indicate whether any of the non-dropped blocks have bits that are to be altered. It will be appreciated that these impairment actions of maintaining, dropping, or altering may be time-variant in that the actions may depend on when a block is received in a sequence of time. Accordingly, the time-variant impairments may be reflected by the channel impairment profile according to a sequence of blocks or time, according to an example embodiment of the invention.

Figure 5B:
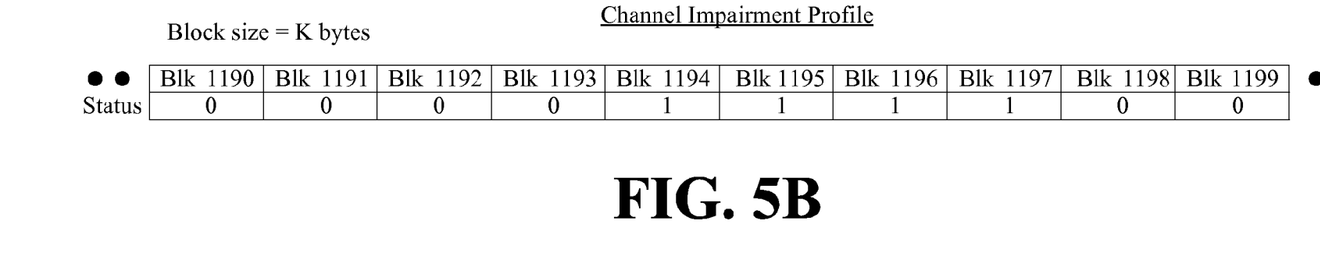
FIGS. 5B and 6B illustrate example respective channel impairment profiles in accordance with example embodiments of the invention.

FIG. 5B illustrates an example of a channel impairment profile that can be generated from the corresponding channel data of FIG. 5A. In FIG. 5B, the channel impairment profile specifies a look-up table which provides a cross-reference for particular block and a corresponding impairment status. More specifically, a first predetermined value (i.e., a "0") is utilized to indicate which blocks are to be retained, while a second predetermined value (i.e., a "1") is utilized to indicate which blocks are to be dropped. In the channel impairment profile of FIG. 5B, blocks 1194, 1195, 1196, and 1197 may be dropped based upon the presence of one or more bit errors present in those blocks according to the channel data in FIG. 5A. It will be appreciated that in an alternative embodiment, the presence of a bit error at a block may not necessarily result in that particular block being dropped according to the channel impairment profile. Instead, the channel impairment profile may simply indicate, for that particular block, which bit(s) are to be altered, for example, by the flipping of the bit at that location. According to this alternative, the channel impairment profile may indicate, for example, that bit 397 of block 1194 needs to be altered; bit 456 of block 1195 needs to be altered, bit 344 of block 1196 needs to be altered, and bit 499 of block 1197 needs to be altered (see, e.g., FIG. 8). It will be appreciated that these and other time-variant impairments (maintain, drop, alter, etc.) may be specified by the channel impairment profile.

Figure 6B:
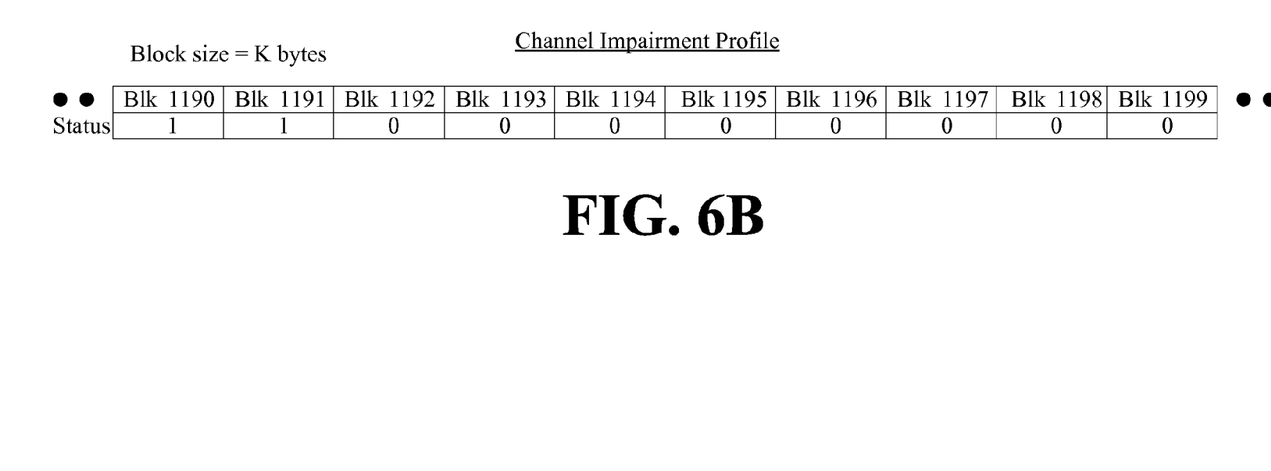

FIG. 6B illustrates another example of a channel impairment profile that can be generated from the corresponding channel data of FIG. 6A. In FIG. 6B, the channel impairment profile specifies a look-up table that provides a cross-reference for a particular block and corresponding impairment status. More specifically, a first predetermined value (i.e., a "0") is utilized to indicate which blocks are to be maintained, while a second predetermined value (i.e., a "1") is utilized to indicate which blocks are to be dropped. In FIG. 6B, blocks 1190 and 1191 are to be dropped based upon the corresponding bit error rates for those blocks exceeding a threshold value in FIG. 6A. In an alternative embodiment of the invention, the presence of a bit error rate above a threshold may result in one or more bits of a block being altered instead of the block being dropped. According to this alternative, the channel impairment profile may indicate, for example, that bit XXX of block 1190 needs to be flipped, and that bit YYY of block 1191 needs to be flipped. It will be appreciated that the particular bit(s) of block 1190 and 1191 that are to be altered (e.g., flipped) may be determined by evaluating each bit of the block according to the bit error rate, according to an example embodiment of the invention. For example, the bit error rate may merely represent a probability that any particular bit in the block will be altered, and each bit in the block can be analyzed independently with respect to the bit error rate to determine whether that respective bit is to be altered, according to an example embodiment of the invention.

It will be appreciated that while example channel impairment profiles have been described with respect to FIGS. 5B and 6B, other kinds of channel impairment profiles are available without departing from example embodiments of the invention.

Referring back to FIG. 4, once the channel impairment profiles have been generated at block 410, processing may proceed to block 415. At block 415, the link emulator computer 350 may receive a specification or selection of two or more channel impairment profiles 312*a-n* for use in generating a composite impairment profile 308. Generally, a user may specify or select two or more channel impairment types that are to be concurrently emulated to reflect multiple channel impairments. The selection of the two or more channel impairment types may be mapped to a selection of two or more corresponding channel impairment profiles 312*a-n*. In an alternative embodiment of the invention, the user may directly specify or select the two or more channel impairment profiles 312*a-n* that are to be used in generating a composite impairment profile 308.

Once the specification or selection of two or more channel impairment profiles are selected at block 415, then processing may proceed to block 420. At block 420, a composite impairment profile can be generated from the specified or selected two or more channel impairment profiles. In an example embodiment of the invention, the composite impairment profile 308 may be generated by combining two or more channel impairment profiles 312*a-n* using a combiner module 310. In an example embodiment of the invention, the combiner module 310 may provide logical AND, OR, or NOR operators, or a combination of mathematical or statistical operators.

Figure 7:
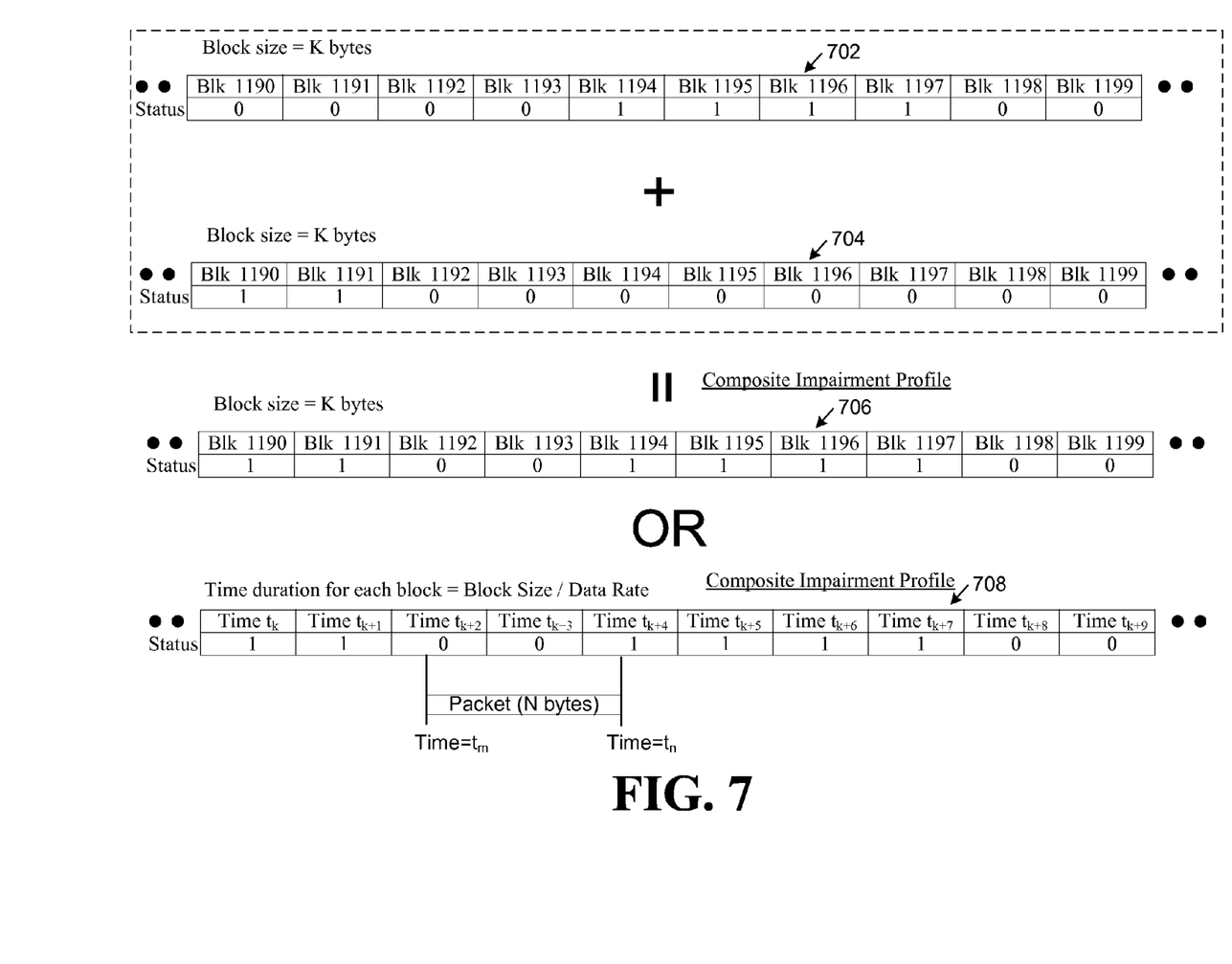
FIGS. 7 and 8 illustrate example respective composite impairment profiles generated from respective channel impairment profiles, according to example embodiments of the invention.

FIG. 7 illustrates an example combination of two example channel impairment profiles 702, 704 to generate example composite impairment profiles 706, 708. As shown in FIG. 7, the two example channel impairment profiles 702, 704 correspond to those described previously with respect to FIGS. 5B and 6B. A combiner module 310 in the form of a logical OR operator is then used to combine the two example channel impairment profiles 702, 704. With the use of a logical OR operator, the presence of a "1" (drop) indicated by any block of channel impairment profiles 702, 704 will likewise be reflected in the first composite impairment profile 706 or the second composite impairment profile 708. Accordingly, these time-variant impairments from the channel impairment profiles 702, 704 can be aligned according to particular sequences of blocks or time periods, and combined in respective sequences or blocks or time periods in the composite impairment profiles 706 or 708.

In particular, as shown by the first composite impairment profile 706, blocks 1190, 1191, 1194, 1995, 1996, and 1197 include at least one bit error, and are slated or designated to be dropped, while blocks 1192, 1193, 1198, and 1199 are to be maintained or not dropped. It will be appreciated that the indication of a "1" (drop) for blocks 1194, 1195, 1196, and 1197 was contributed from the channel impairment profile 702. Likewise, the indication of a "1" (drop) for blocks 1190, 1191 was contributed from the channel impairment profile 704. It will be appreciated that while the first composite impairment profile 706 is based upon block positions, a second composite impairment profile 708 may be based upon a time period or duration, perhaps a time period or duration for each block. In an example embodiment of the invention, the time period or duration for each block may be calculated by dividing the block size by the data rate. Once the time period or duration for each block has been generated, the first composite impairment profile 706 may be transformed to the second composite impairment profile 708. In the second composite impairment profile 708, the time sequence may be specified as Time $t_k$, Time $t_{k+1}$, Time $t_{k+2}$ ..., where each time sequence is a sequential multiple of the calculated time period or duration for each block. For example, Time $t_k$ may be time zero (0), Time $t_{k+1}$ may be equal to 1 times (1×) the calculated time duration, and Time $t_{k+2}$ may be equal to 2 times (2×) the calculated time duration. The second composite impairment profile 708 may be utilized in conjunction with a timing data from a timing device or real-time clock 306 to determine which packets or frames of a real-time data stream should be maintained, dropped, or altered, according to an example embodiment of the invention.

It will be appreciated that a block size may be based upon digital signal processing (DSP) capabilities, and may not span a complete packet or frame having N bytes. Indeed, as illustrated by FIG. 7, a particular packet or frame may span a Time=$t_m$ to $t_n$, which may span more than a time period or duration for any one block. As will be described herein in further detail, a received packet or frame may be dropped if it falls within any block or time sequence that designates a "drop" for that particular block or time sequence, as provided by the composite impairment profiles 706 or 708.

Figure 8:
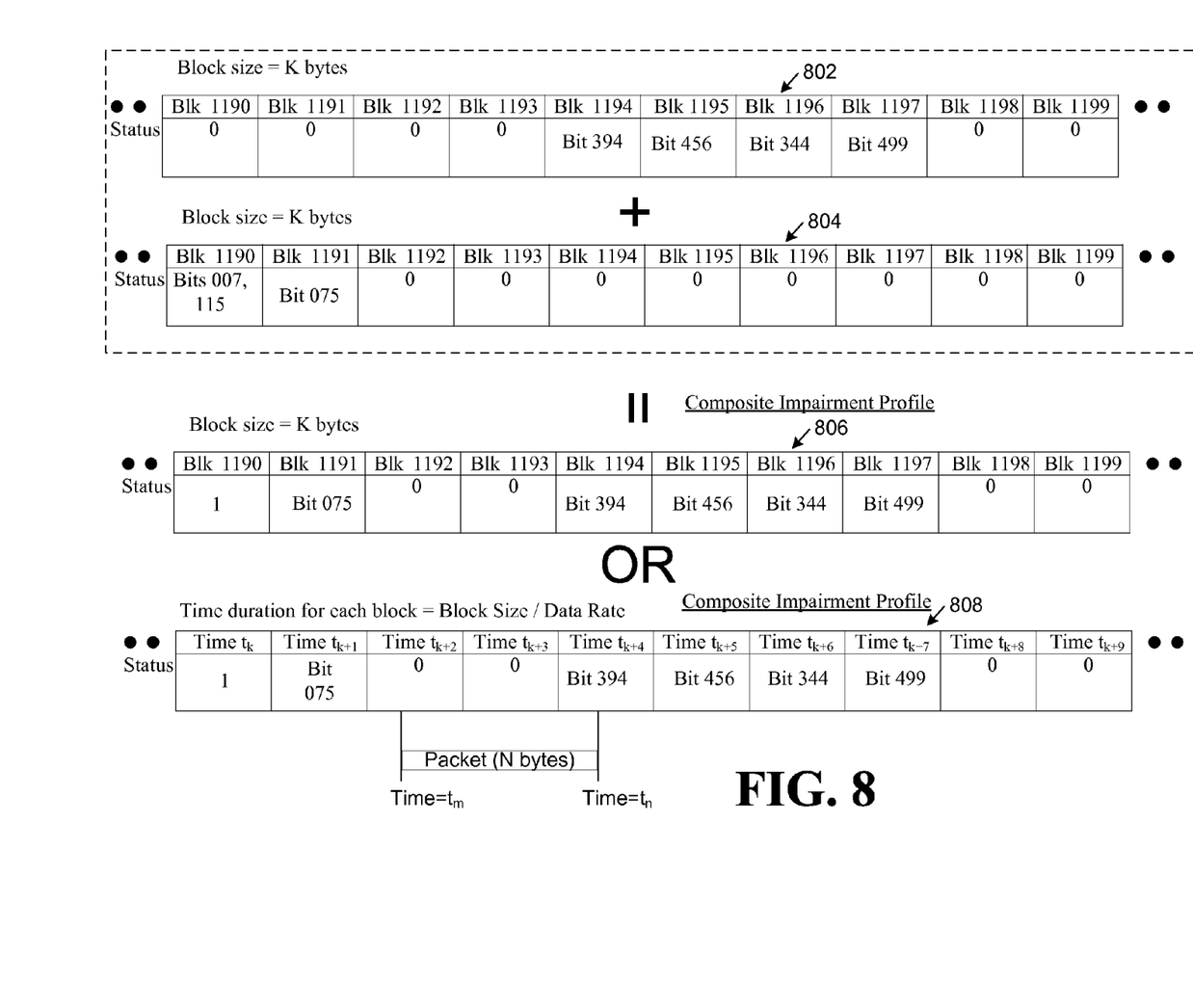

FIG. 8 illustrates an alternative combination of two example channel impairment profiles 802, 804 to generate example composite impairment profiles 806, 808. The channel impairment profiles 802, 804 are alternatives to the channel impairment profiles 702, 704 described previously with respect to FIG. 7. In particular, instead of merely dropping all blocks having an error, the channel impairment profile 802 may instead specify, for at least some blocks that would otherwise be dropped, which bits that are to be altered in those blocks. For example, channel impairment profile 802 indicates that bit 394 of block 1194 should be altered; bit 456 of block 1195 should be altered; bit 344 of block 1196 should be altered; and bit 499 of block 1197 should be altered. Similarly, channel impairment profile 804 likewise specifies which bits should be altered in blocks 1190 and 1191. Thus, the combination of channel impairment profiles 802, 804 may generate a composite impairment profile 806 that likewise indicates one or more blocks in which one or more bits are to be altered.

For example, a first composite impairment profile 806 may be generated that shows blocks that are to be maintained ("0"), dropped ("1"), or altered (specifies a particular bit). More specifically, the first composite impairment profile 806 indicates that block 1190 is to be dropped, perhaps based upon at least two bit errors being present in the block according to the channel impairment profile 804. On the other hand, blocks 1191, 1194, 1995, 1196, and 1197 may be retained, but altered, based upon only one bit error being present in the respective block according to the channel impairment profiles 802, 804. The second composite impairment profile 808 is similar to the first composite impairment profile, except that it is based upon a time sequence instead of block sequence, as similarly described with respect to FIG. 7.

Referring back to FIG. 4, once a composite impairment profile 308 (e.g., profiles 706, 708, 806, or 808) has been generated at block 420, then the link emulator module 302 may be operative to provide concurrent emulation of multiple channel impairments to a real-time stream of data or information. The processing in FIG. 4 is then complete.

Figure 9:
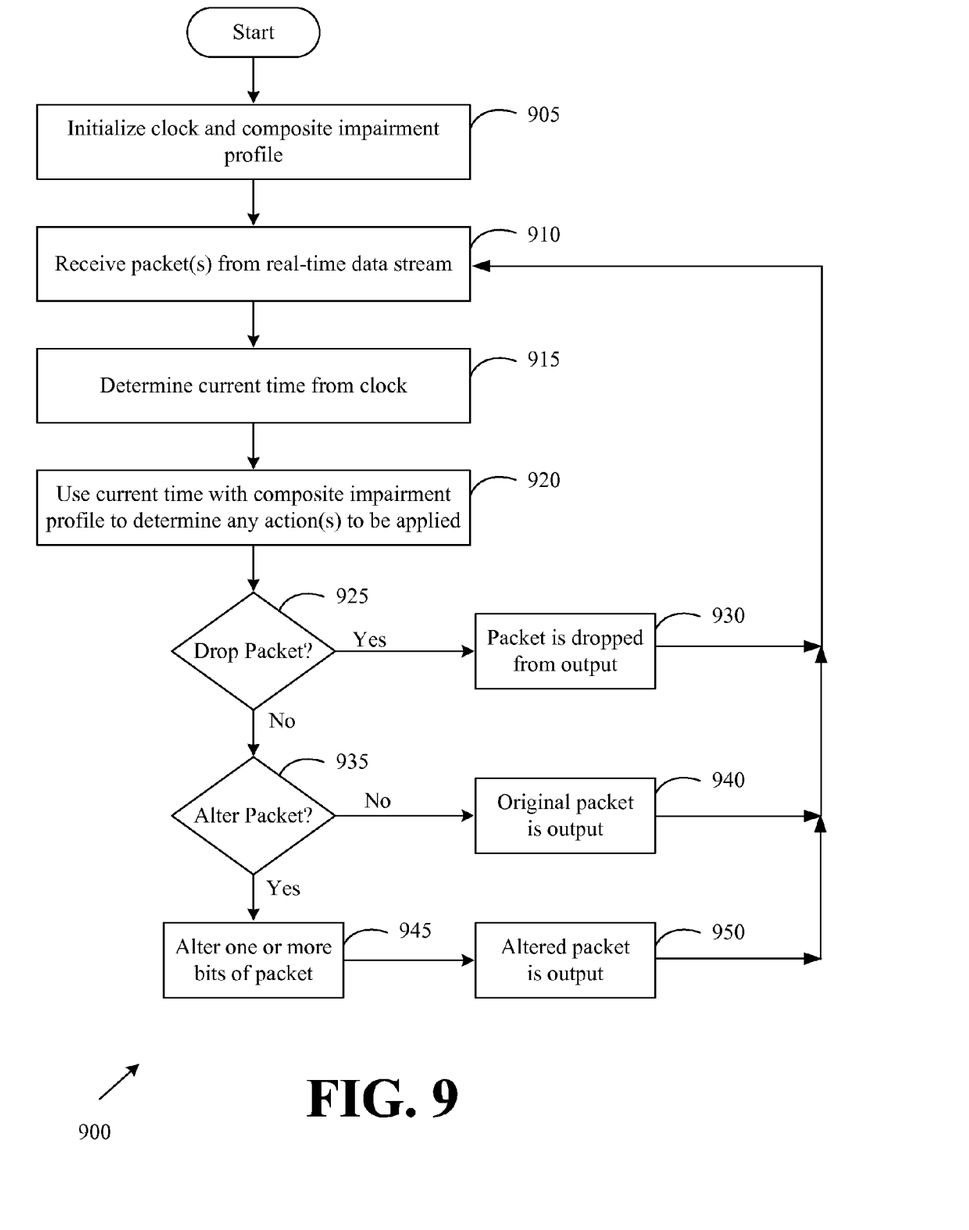
FIG. 9 illustrates an example flow diagram for providing concurrent emulation of multiple channel impairments to a real-time data stream of data or information, according to an example embodiment of the invention.
Figure 10:
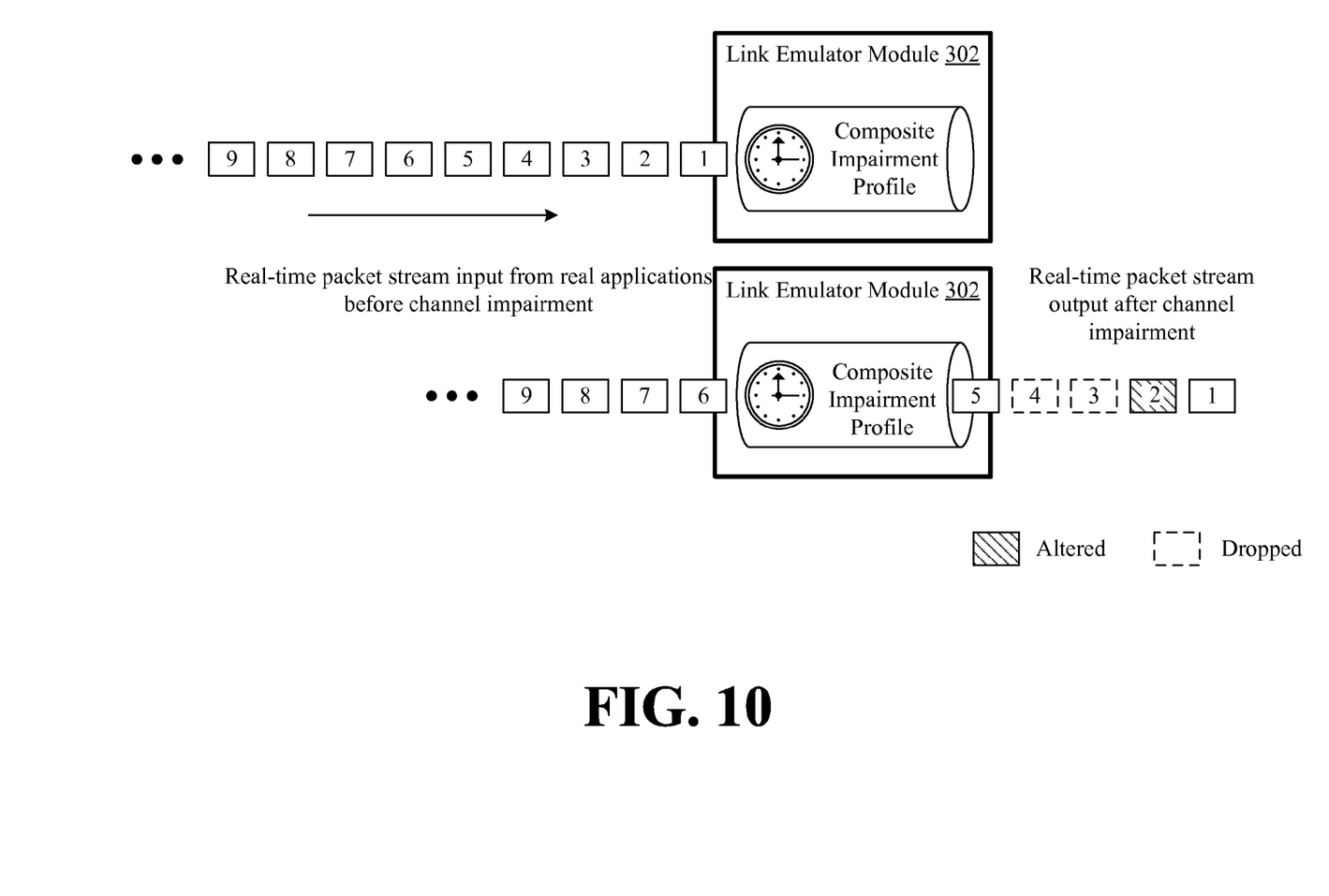
FIG. 10 illustrates an example block diagram of example inputs and outputs of an example link emulator module, according to an example embodiment of the invention.

FIG. 9 illustrates an example flow diagram for providing concurrent emulation of multiple channel impairments to a real-time data stream of data or information, according to an example embodiment of the invention. The example flow diagram of FIG. 9 will be discussed in conjunction with FIG. 10, which illustrates example inputs and outputs of an example link emulator module 302, according to an example embodiment of the invention.

At block 905, the link emulator module 302 may initialize the timing device or real-time clock 306 and the composite impairment profile 308. More specifically, where a composite impairment profile 308 is based upon a time sequence (e.g., composite impairment profiles 706, 708, 806, or 808), the timing device or clock may be initialized (e.g., set to zero or another initial value) to synchronize with the first time sequence (e.g., Time $t_k$) provided by the composite impairment profile 308. The synchronization may be necessary to ensure that the correct packet or frame is maintained, dropped, or altered according to the specifications of the composite impairment profile 308. The timing device or real-time clock 306 may further be synchronized with the receipt of a particular (e.g., the first or initial) packet or frame of the real-time data stream.

At block 910, the link emulator module 302 receives a packet or frame from an application (e.g., VoIP, Instant Messanger, etc.). At block 915, the link emulator module 302 determines, from the timing device or real-time clock 306, one or more times or time periods associated with receipt of the particular packet or frame at block 910. Indeed, a packet or frame can span a plurality of times or time periods, according to an example embodiment of the invention. It will be appreciated that following initialization of the timing device or clock at block 905, the timing device or clock will provide continuous and sequential timing data so that the time(s) or time period(s) associated with receipt of the packet or frame at block 910 can be determined.

At block 920, the determined time(s) or time period(s) associated with receipt of the packet or frame is then utilized with the composite impairment profile 308 to determine which real-time impairment actions (e.g., maintain, drop, alter, etc.) should be applied to the packet or frame received at block 910. If the composite impairment profile 308 is based upon a time sequence, then the determined time(s) associated with receipt of the packet or frame can be used to look up the appropriate action at that determined time. As indicated by blocks 925 and 935, the appropriate action can include (i) dropping the packet or frame from the output at block 930, (ii) outputting the original packet or frame at block 940, or (iii) altering one or more bits of the packet or frame at block 945 and outputting the altered packet or frame at block 950. Using the composite impairment profile 708 as an example, if any of the determined time(s) fall within Times $t_k$, $t_{k+1}$, $t_{k+4}$, $t_{k+5}$, $t_{k+6}$, or $t_{k+7}$, then the packet or frame may be dropped from the output at block 930. Otherwise, the original packet or frame may be output at block 940. Alternatively, instead of dropping the packet or frame at block 930, the composite impairment profile 308 (e.g., see profile 808) could instead specify which bit(s) of the packet or frame is to be altered (e.g., flip of a bit) at block 945 so that an altered packet or frame can be output at block 950. Following blocks 930, 940, or 950, processing can return to block 910 for processing of any additional packets or frames that are received by the real-time data stream. Accordingly, the use of the composite impairment profile 308 may allow for an input real-time stream of data or information to be impacted in real-time in accordance with multiple channel impairments incorporated into the composite impairment profile 308. The resulting output real-time stream of data or information can then used to test or evaluate actual end system applications during typical or expected in-the-field operations.

Various block and/or flow diagrams of systems, methods, apparatuses, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A multi-channel emulator system, comprising:
    a memory that stores a plurality of channel impairment profiles, wherein each channel impairment profile corresponds to a respective channel impairment type;
    a real-time clock that generates timing data; and
    a processor in communication with the memory and the real-time clock, wherein the processor is configured to:
        receive a selection of two or more of the plurality of channel impairment profiles,
        generate a composite impairment profile by combining the selected two or more channel profiles, the composite impairment profile specifying time-variant impairments, the composite impairment profile reflecting a combination of the respective impairment types of the selected channel profiles, and
        apply the time-variant impairments specified by the composite impairment profile to an input real-time data stream to generate an impaired real-time data stream, wherein a timing of the application of the time-variant impairments is based at least in part upon the timing data from the real-time clock.

2. The system of claim 1, wherein the composite impairment profile designates that one or more packets or frames are to be dropped or altered during one or more predetermined time periods.

3. The system of claim 2, wherein the processor is configured to apply the time-variant impairments specified by the composite impairment profile by:
    synchronizing the timing data from the real-time clock with a receipt of an initial packet or frame of the input real-time data stream; and
    upon the timing data indicating an occurrence of the one or more predetermined time periods specified by the composite impairment profile, dropping or altering the one or more packets when generating the impaired real-time data stream.

4. The system of claim 2, wherein the composite impairment profile designates that one or more packets or frames are to altered, wherein the composite impairment profile further designates which bit or bits to alter in the one or more time periods.

5. The system of claim 1, wherein the respective impairment types are associated with impairments resulting from one or more of (i) noise, (ii) signal blockage, (iii) signal jamming, (iv) environmental conditions, or (v) nuclear scintillation.

6. The system of claim 1, wherein the selected two or more channel profiles comprise respective look-up tables having overlapping time periods, wherein the selected two or more channel profiles provide respective designations of whether a packet or frame is to be retained or dropped during a particular time period.

7. The system of claim 6, wherein at least one of the packet or frame that is to be retained can be altered with respect to at least one bit within the at least one retained packet or frame.

8. The system of claim 6, wherein the processor is configured to generate a composite impairment profile that is a composite look-up table based upon a combination of respective look-up tables of the selected two or more channel profiles using a logical OR or XOR operator.

9. The system of claim 1, wherein a first of the channel impairment profiles is generated using channel impairment data, the channel impairment data specifying time-variant impairment data.

10. The system of claim 9, wherein the time-variant impairment data indicates a variation of one or more of (i) bit error rates, (ii) signal strengths, (iii) erred bit location or position, (iv) blockage status, (v) packet error rate, over a period of time.

11. The system of claim 10, wherein the signal strengths comprise at least one of reception signal strengths or jammer signal strengths.

12. The system of claim 9, wherein the first channel impairment profile is generated by converting the time-variant impairment data into a decision of whether to retain, drop, or alter a packet or frame for each of a plurality of time periods covered by the time-variant impairment data.

13. A computer-implemented method, comprising:
    storing, in a memory, a plurality of channel impairment profiles, wherein each channel impairment profile corresponds to a respective channel impairment type;
    receiving a selection of two or more of the plurality of channel profiles;
    generating a composite impairment profile by combining the selected two or more channel profiles, the composite profile specifying time-variant impairments, the composite profile reflecting a combination of the respective impairment types of the selected channel profiles; and
    applying the time-variant impairments specified by the composite profile to an input real-time data stream to generate an impaired real-time data stream, wherein a timing of the application of the time-variant impairments is based at least in part upon timing data from a real-time clock,
    wherein the prior steps are performed by one or more computers.

14. The method of claim 13, wherein the composite impairment profile designates that one or more packets or frames are to be dropped or altered during one or more predetermined time periods.

15. The method of claim 14, wherein applying the time-variant impairments comprises:
    synchronizing the timing data from the real-time clock with a receipt of an initial packet or frame of the input real-time data stream; and
    upon the timing data indicating an occurrence of the one or more predetermined time periods specified by the composite impairment profile, dropping or altering the one or more packets when generating the impaired real-time data stream,
    wherein the prior steps are performed by one or more computers.

16. The method of claim 14, wherein the composite impairment profile designates that one or more packets or frames are to altered, wherein the composite impairment profile further designates which bit or bits to alter in the one or more time periods.

17. The method of claim 13, wherein the selected two or more channel profiles comprise respective look-up tables having overlapping time periods, wherein the selected two or more channel profiles provide respective designations of whether a packet or frame is to be retained or dropped during a particular time period.

18. The method of claim 17, wherein at least one of the packet or frame that is to be retained can be altered with respect to at least one bit within the at least one retained packet or frame.

19. The method of claim 17, wherein a first of the channel impairment profiles is generated using channel impairment data, the channel impairment data specifying time-variant impairment data.

20. The method of claim 19, wherein the first channel impairment profile is generated by converting the time-variant impairment data into a decision of whether to retain, drop, or alter a packet or frame for each of a plurality of time periods covered by the time-variant impairment data.

* * * * *